US008104275B2

(12) United States Patent
Koo

(10) Patent No.: US 8,104,275 B2
(45) Date of Patent: Jan. 31, 2012

(54) HYDRAULIC CIRCUIT FOR HEAVY EQUIPMENT

(75) Inventor: Bon Seok Koo, Kyungsangnam-do (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 813 days.

(21) Appl. No.: 12/206,775

(22) Filed: Sep. 9, 2008

(65) Prior Publication Data

US 2009/0071141 A1 Mar. 19, 2009

(30) Foreign Application Priority Data

Sep. 17, 2007 (KR) ........................ 10-2007-0093981

(51) Int. Cl.
*F16D 31/02* (2006.01)

(52) U.S. Cl. ........................................................ 60/420

(58) Field of Classification Search .................... 60/420, 60/445

See application file for complete search history.

(56) References Cited

U.S. PATENT DOCUMENTS 4,067,193 A * 1/1978 Norick ............................ 60/445
5,277,027 A * 1/1994 Aoyagi et al. .................. 60/420
6,799,424 B2 * 10/2004 Ioku et al. ....................... 60/420

* cited by examiner

*Primary Examiner* — Daniel Lopez
(74) *Attorney, Agent, or Firm* — Ladas & Parry LLP

(57) ABSTRACT

A hydraulic circuit for heavy equipment is provided, which can prevent signal pressure exceeding a predetermined pressure from being formed in a pilot signal path provided in a switching valve to sense whether the switching valve has been shifted in a hydraulic system that minimizes the discharge flow rate of a hydraulic pump when a working device such as a boom is not driven. The hydraulic circuit includes first to fourth hydraulic pumps connected to an engine, first switching valves installed in flow paths of the first hydraulic pump and shifted to control hydraulic fluid fed to a working device, second switching valves installed in flow paths of the second hydraulic pump and shifted to control hydraulic fluid fed to a working device, third switching valves installed in flow paths of the third hydraulic pump and shifted to control hydraulic fluid fed to a swing device, a pilot signal path for sensing whether the first to third switching valves are shifted, a throttling part installed in the pilot signal path to form a signal pressure, and a valve installed in a parallel flow path branch-connected to the pilot signal path and supplying the signal pressure in the pilot signal path to the pilot signal pressure supply path when a signal pressure exceeding a predetermined pressure is formed in the pilot signal path.

5 Claims, 4 Drawing Sheets

HYDRAULIC CIRCUIT FOR HEAVY EQUIPMENT

CROSS-REFERENCE TO RELATED APPLICATION

This application is based on and claims priority from Korean Patent Application No. 10-2007-0093981, filed on Sep. 17, 2007 in the Korean Intellectual Property Office, the disclosure of which is incorporated herein in its entirety by reference.

BACKGROUND OF THE INVENTION

1. Field of the Invention

The present invention relates to a hydraulic circuit for heavy equipment, which can save energy of the hydraulic circuit by minimizing the discharge flow rate of a hydraulic pump through reduction of revolution of an engine when a working device such as a boom and so on is not driven.

More particularly, the present invention relates to a hydraulic circuit for heavy equipment, which can prevent signal pressure that exceeds a predetermined pressure from being formed in a pilot signal path provided in a switching valve to sense whether the switching valve for controlling hydraulic fluid fed to a working device has been shifted.

2. Description of the Prior Art

Referring to FIG. 1, a conventional hydraulic circuit for heavy equipment includes first to fourth hydraulic pumps P1, P2, P3, and P4 connected to an engine; first switching valves 1, 2, and 3 composed of valves installed in flow paths of the first hydraulic pump P1 and shifted to control hydraulic fluid fed to working devices, such as a boom and so on; second switching valves 4, 5, and 6 composed of valves installed in flow paths of the second hydraulic pump P2 and shifted to control hydraulic fluid fed to working devices, such as an arm and so on; third switching valves 7 and 8 composed of valves installed in flow paths of the third hydraulic pump P3 and shifted to control hydraulic fluid fed to a swing device and so on; a pilot signal path 11 connected to a hydraulic tank T1 through the switching valves 1 to 8 to sense whether the switching valves 1 to 8 are shifted, and receiving pilot signal pressure Pi flowing from the fourth hydraulic pump P4 to the pilot signal path 11 through an inlet port Pi1; a throttling part 10 installed on a side of an inlet port Pi1 so that the signal pressure is formed in the pilot signal path 11; and a pressure switch 9 installed on a side of a signal sensing port Pa branch-connected to the pilot signal path 11, and detecting the signal pressure of the pilot signal path 11 so as to control the speed of an engine.

In the case where an operator shifts the switching valves by operating an operation lever (not illustrated), the pilot signal path 11 is intercepted. A connection flow path between the hydraulic pump and the working device during the shifting of the corresponding switching valve is not separately marked.

As illustrated in FIG. 3, the pilot signal path 11 is alternately formed with signal paths a and b on a valve body 12 of the respective valve, and since the signal paths a and b are intercepted in accordance with the shifting of a spool 13, signal pressure is formed in the pilot signal path 11. Simultaneously, the signal pressure is also formed in the signal sensing port Pa branch-connected to the pilot signal path 11.

Accordingly, in a neutral state of the switching valves 1 to 8 connected to the first to third hydraulic pumps P1, P2, and P3, no signal pressure is formed in the pilot signal path 11.

Accordingly, it is judged that the working device is not operated, and thus the engine revolution of the equipment is reduced.

By contrast, in the case of shifting any one of the switching valves 1 to 8, the signal pressure is formed in the pilot signal path 11, and thus the engine revolution can be accelerated by the above-described signal pressure.

Accordingly, in the case where a working device such as a boom and so on is not operated, an auto idle function for minimizing a loss of energy of the hydraulic system through reduction of the engine revolution can be performed.

In the conventional hydraulic circuit for heavy equipment as illustrated in FIGS. 1 to 3, a specified gap due to the assembling tolerance occurs between the valve body 12 and the spool 13 so that the respective spool 13 of the above-described switching valves 1 to 8 is slidably shifted in left or right direction in the valve body 12.

As illustrated in FIGS. 2 and 3, the signal paths a and b, which are coupled to the pilot signal path 11, are arranged between pump paths 14 and 15 formed inside the valve body 12 to keep a high pressure therein. Accordingly, high-pressure hydraulic fluid flows into the signal paths a and b through the gap between the valve body 12 and the spool 13.

In this case, due to foreign substances flowing between the valve body 12 and the spool 13, damage or abrasion of the sliding surface occurs, and this causes the amount of hydraulic pump flowing from the hydraulic pump to the signal paths a and b to be increased.

As described above, in the case where the high-pressure signal pressure is formed in the pilot signal path 11 by the high-pressure hydraulic fluid flowing from the hydraulic pump to the signal paths a and b, the pressure in the pressure switch 9 that is installed on the signal sensing line coupled to the pilot signal path 11 exceeds a predetermined pressure, and this causes the damage of the pressure switch 9.

SUMMARY OF THE INVENTION

Accordingly, the present invention has been made to solve the above-mentioned problems occurring in the prior art while advantages achieved by the prior art are maintained intact.

One object of the present invention is to provide a hydraulic circuit for heavy equipment, which can prevent damage of a pressure switch due to an inflow of high-pressure hydraulic fluid from a hydraulic pump to a pilot signal path that is formed in a respective switching valve for controlling hydraulic fluid being fed to a working device such as a boom and so on when the working device is not driven in the hydraulic circuit implementing an auto idle function.

In order to accomplish this and other objects, there is provided a hydraulic circuit for heavy equipment, according to an embodiment of the present invention, which includes first to fourth hydraulic pumps connected to an engine; first switching valves composed of valves installed in flow paths of the first hydraulic pump and shifted to control hydraulic fluid fed to working devices including a boom; second switching valves composed of valves installed in flow paths of the second hydraulic pump and shifted to control hydraulic fluid fed to working devices including an arm; third switching valves composed of valves installed in flow paths of the third hydraulic pump and shifted to control hydraulic fluid fed to a swing device; a pilot signal path connected to a hydraulic tank through the first to third switching valves to sense whether the first to third switching valves are shifted, and coupled to a pilot signal pressure supply path of the fourth hydraulic pump; a throttling part installed in the pilot signal path to form a signal pressure; and a valve installed in a parallel flow path branch-connected to the pilot signal path on upstream and downstream sides of the throttling part, and supplying the signal pressure in the pilot signal path to the pilot signal pressure supply path when a signal pressure that exceeds a predetermined pressure is formed in the pilot signal path.

In this case, a check valve for permitting a transfer of the signal pressure from the pilot signal path to the pilot signal pressure supply path may be used as the above-described valve.

In another aspect of the present invention, there is provided a hydraulic circuit for heavy equipment, according to an embodiment of the present invention, which includes first to fourth hydraulic pumps connected to an engine; first switching valves composed of valves installed in flow paths of the first hydraulic pump and shifted to control hydraulic fluid fed to working devices including a boom; second switching valves composed of valves installed in flow paths of the second hydraulic pump and shifted to control hydraulic fluid fed to working devices including an arm; third switching valves composed of valves installed in flow paths of the third hydraulic pump and shifted to control hydraulic fluid fed to a swing device; a pilot signal path connected to a hydraulic tank through the first to third switching valves to sense whether the first to third switching valves are shifted, and coupled to a pilot signal pressure supply path of the fourth hydraulic pump; a throttling part installed in the pilot signal path to form a signal pressure; and a valve installed in a signal pressure sensing line branch-connected to the pilot signal path to detect the signal pressure in the pilot signal path, and discharging the signal pressure in the pilot signal path to the hydraulic tank when a signal pressure that exceeds a predetermined pressure is formed in the pilot signal path.

In this case, a relief valve that is shifted to drain the signal pressure to the hydraulic tank when the signal pressure exceeding the predetermined pressure is formed in the pilot signal path may be used as the above-described valve.

A drain path of the valve may be connected to a port in a control valve, in which the switching valves are installed, and a separate external drain port.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 4:
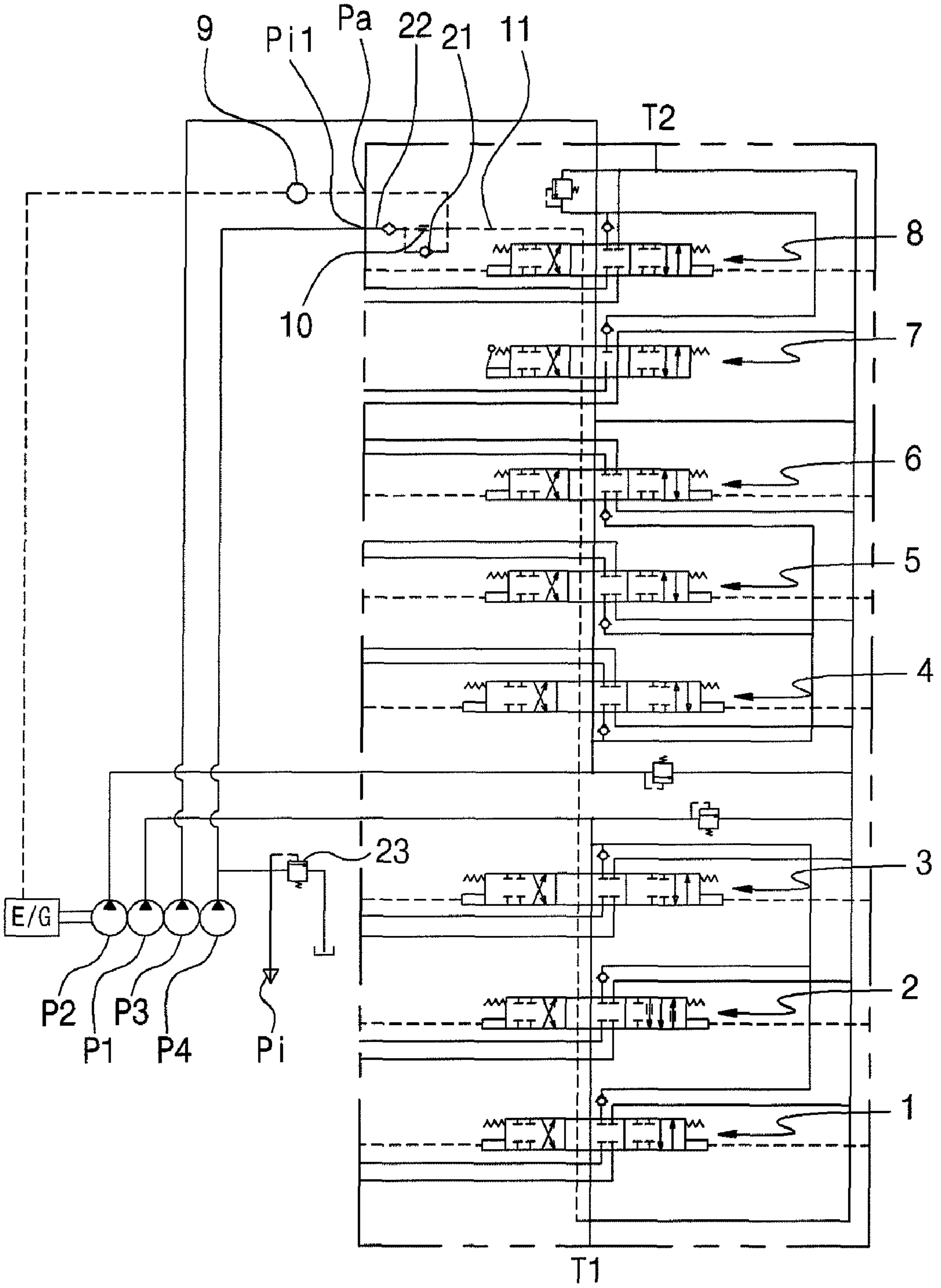
FIG. 4 is a circuit diagram of a hydraulic circuit for heavy equipment according to an embodiment of the present invention.

As illustrated in FIG. 4, the a hydraulic circuit for heavy equipment according to an embodiment of the present invention includes first to fourth hydraulic pumps P1, P2, P3, and P4 connected to an engine; first switching valves 1, 2, and 3 composed of valves installed in flow paths of the first hydraulic pump P1 and shifted to control hydraulic fluid fed to working devices such as a boom and so on; second switching valves 4, 5, and 6 composed of valves installed in flow paths of the second hydraulic pump P2 and shifted to control hydraulic fluid fed to working devices such as an arm and so on; third switching valves 7 and 8 composed of valves installed in flow paths of the third hydraulic pump P3 and shifted to control hydraulic fluid fed to a swing device and so on; a pilot signal path 11 connected to a hydraulic tank T1 through the first to third switching valves 1 to 8 to sense whether the first to third switching valves 1 to 8 are shifted, and coupled to a pilot signal pressure supply path 22 of the fourth hydraulic pump P4; a throttling part 10 installed in the pilot signal path 11 to form a signal pressure; and a valve 21 installed in a parallel flow path 11 branch-connected to the pilot signal path on upstream and downstream sides of the throttling part 10, and supplying the signal pressure in the pilot signal path 11 to the pilot signal pressure supply path 22 when a signal pressure that exceeds a predetermined pressure is formed in the pilot signal path 11.

A check valve for permitting a transfer of the signal pressure from the pilot signal path 11 to the pilot signal pressure supply path 22 may be used as the above-described valve 21.

Figure 1:
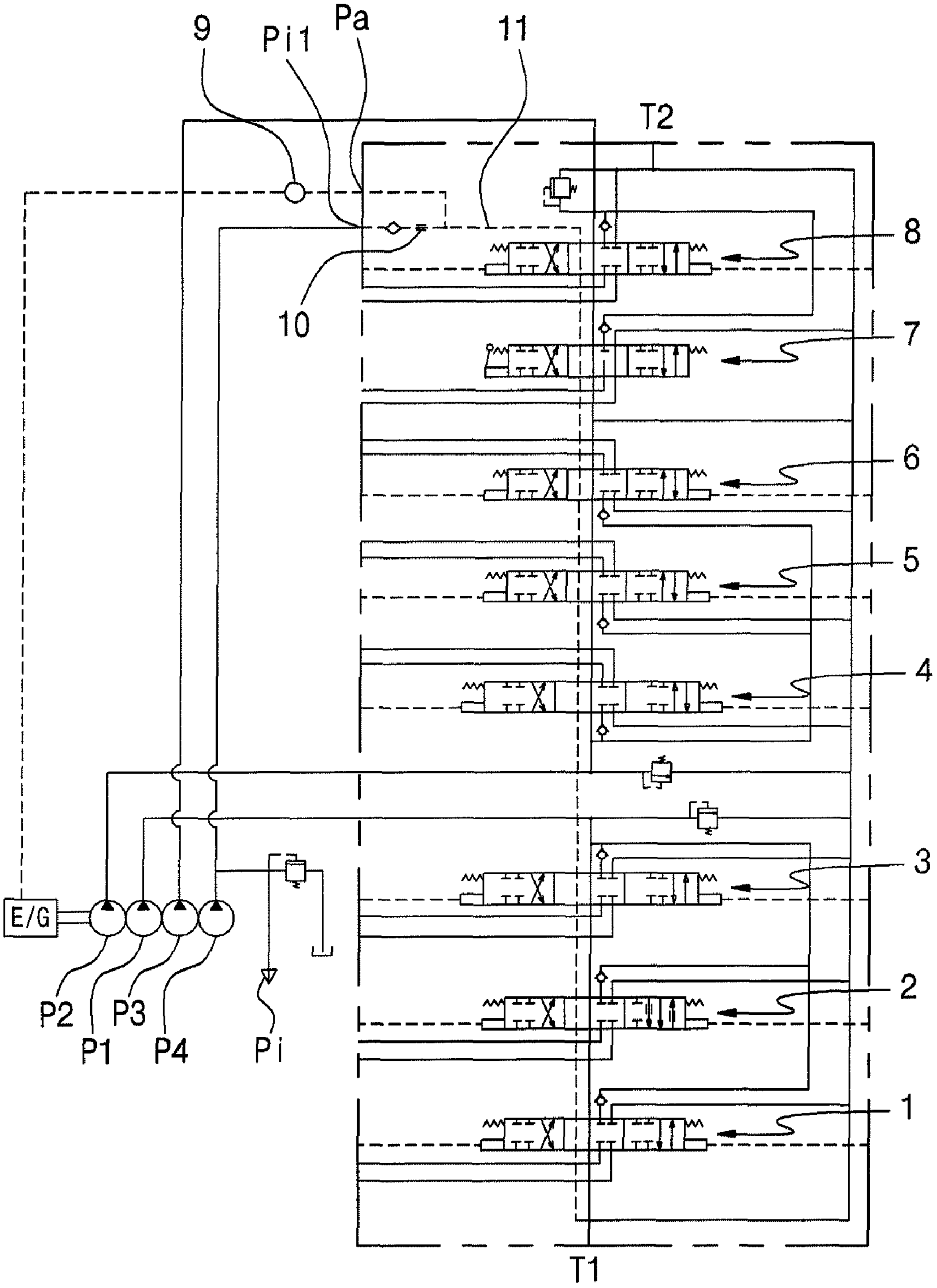
Fig. 1 Prior Art
FIG. 1 is a circuit diagram of a conventional hydraulic circuit for heavy equipment.
Figure 2:
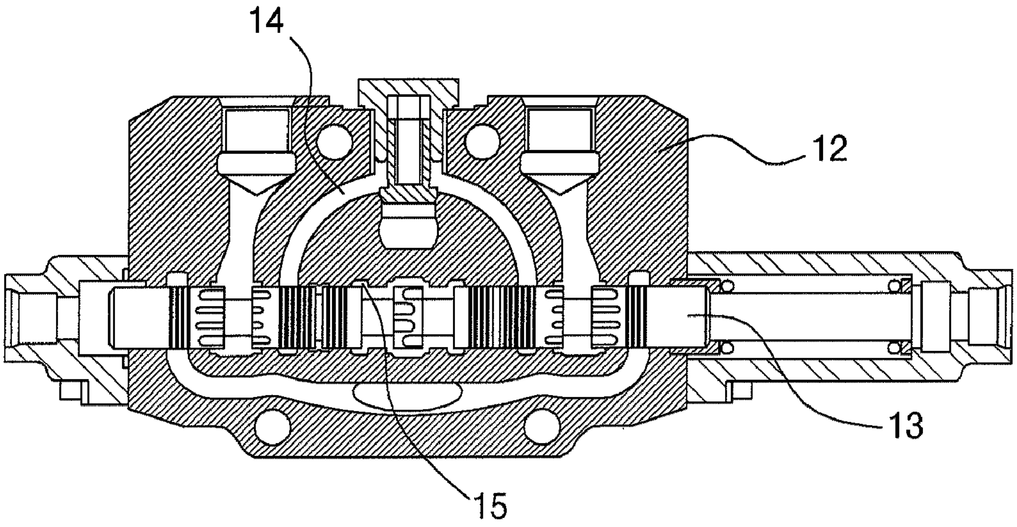
Fig. 2 Prior Art
FIG. 2 is a section view of a switching valve illustrated in FIG. 1.
Figure 3:
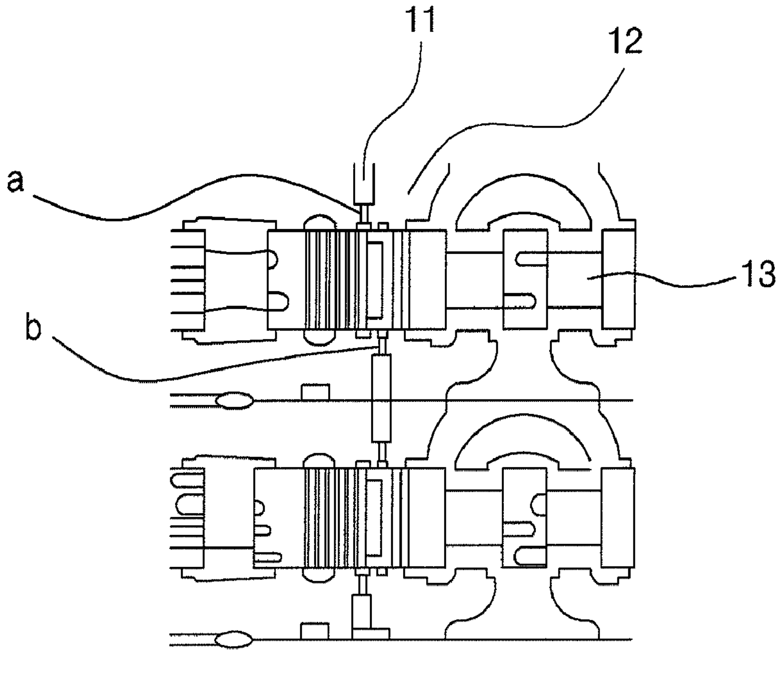
Fig. 3 Prior Art
FIG. 3 is a schematic view illustrating a signal path coupled to a pilot signal path passing inside the switching valve illustrated in FIG. 2.

The construction of the hydraulic circuit according to an embodiment of the present invention, except for the valve 21 installed in the parallel flow path connected to the pilot signal path 11 to keep the predetermined signal pressure in the pilot signal path 11, is substantially the same as the conventional hydraulic circuit as illustrated in FIG. 1, and thus the detailed description thereof will be omitted. The same drawing reference numerals are used for the same elements across various figures.

Hereinafter, the operation of the hydraulic circuit for heavy equipment according to an embodiment of the present invention will be described with reference to the accompanying drawings.

As illustrated in FIG. 4, the respective spool 13 of the switching valves 1 to 8 is assembled in a manner that a specified gap due to the assembling tolerance occurs between the valve body 12 and the spool 13 so that the respective spool 13 can be shifted in left or right direction in the valve body 12. The signal paths a and b, which are coupled to the pilot signal path 11, are arranged between pump paths 14 and 15 formed inside the valve body 12 to keep a high pressure therein.

Accordingly, when the high-pressure hydraulic fluid flows from the hydraulic pump into the signal paths a and b through the gap between the valve body 12 and the spool 13, a high-pressure signal pressure that exceeds the predetermined pressure is formed in the pilot signal path 11.

That is, if the signal pressure formed in the pilot signal path 11 is relatively higher than the pressure in the pilot signal pressure supply path 22, the pilot signal pressure is supplied to the pilot signal pressure supply path 22 through a valve (i.e. check valve) 21 installed in the parallel flow path branch-connected in the upstream and downstream parts.

In this case, the pressure formed in the pilot signal pressure supply path 22 is set not to exceed the pressure in the pilot signal path 11 by the relief valve 23 installed in an upstream flow path of the fourth hydraulic pump P4. Accordingly, it is prevented that overload that exceeds the predetermined pressure occurs in the pilot signal path 11.

Accordingly, the pressure switch 9 installed in the signal sensing line coupled to the pilot signal path 11 is prevented from being damaged due to the pressure exceeding the predetermined pressure.

Figure 5:
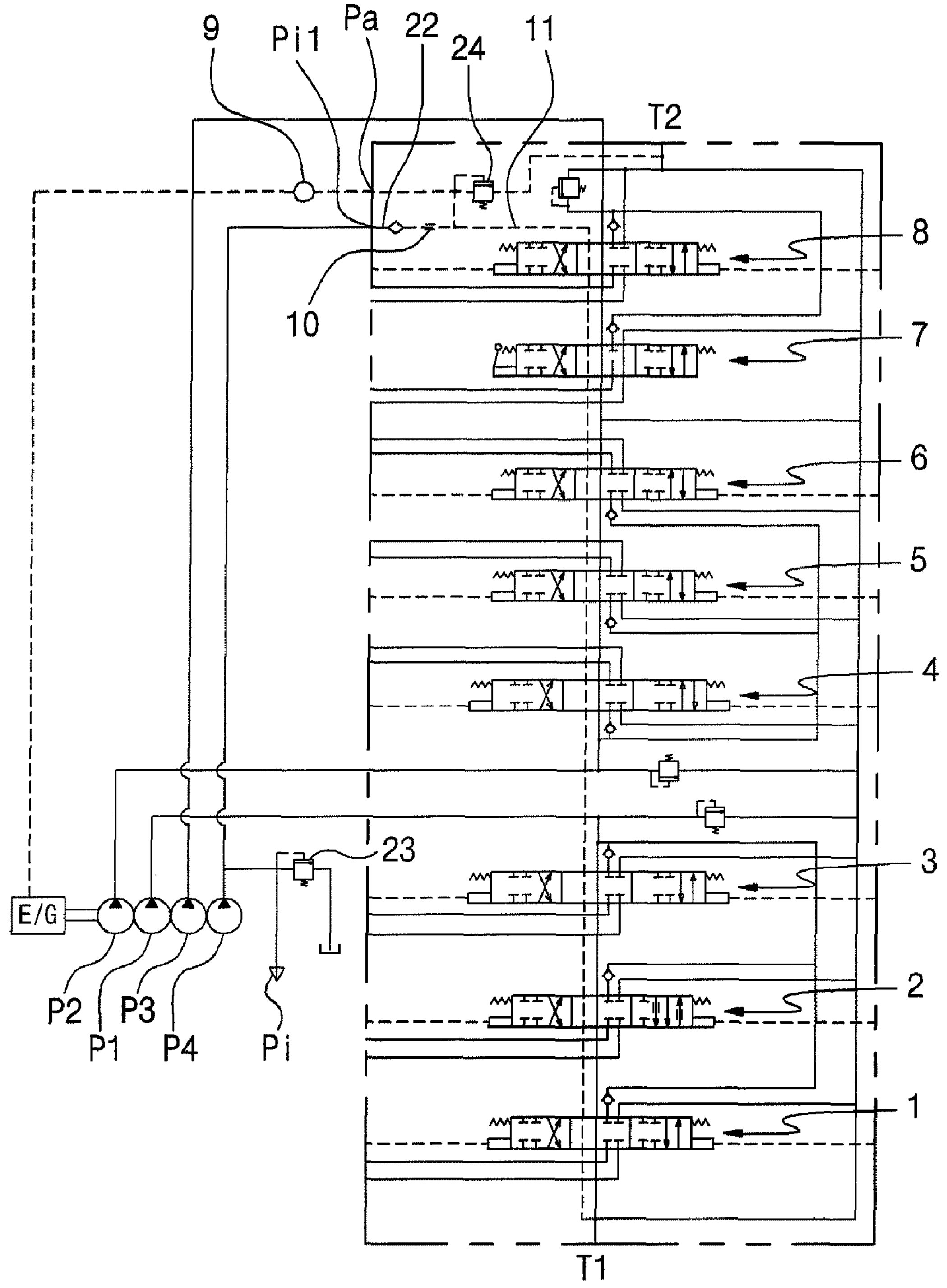
FIG. 5 is a circuit diagram of a hydraulic circuit for heavy equipment according to another embodiment of the present invention.

As illustrated in FIG. 5, the a hydraulic circuit for heavy equipment according to another embodiment of the present invention includes first to fourth hydraulic pumps P1, P2, P3, and P4 connected to an engine; first switching valves 1, 2, and 3 composed of valves installed in flow paths of the first hydraulic pump P1 and shifted to control hydraulic fluid fed to working devices such as a boom and so on; second switching valves 4, 5, and 6 composed of valves installed in flow paths of the second hydraulic pump P2 and shifted to control hydraulic fluid fed to working devices such as an arm and so on; third switching valves 7 and 8 composed of valves installed in flow paths of the third hydraulic pump P3 and shifted to control hydraulic fluid fed to a swing device and so on; a pilot signal path 11 connected to a hydraulic tank T1 through the first to third switching valves 1 to 8 to sense whether the first to third switching valves 1 to 8 are shifted, and coupled to a pilot signal pressure supply path 22 of the fourth hydraulic pump P4; a throttling part 10 installed in the pilot signal path 11 to form a signal pressure; and a valve 24 installed in a signal pressure sensing line branch-connected to the pilot signal path 11 to detect the signal pressure in the pilot signal path 11, and discharging the signal pressure in the pilot signal path 11 to the hydraulic tank T2 when a signal pressure that exceeds a predetermined pressure is formed in the pilot signal path 11.

In this case, a relief valve that is shifted to drain the signal pressure to the hydraulic tank T2 when the signal pressure exceeding the predetermined pressure is formed in the pilot signal path 11 may be used as the valve 24.

A drain path of the valve (i.e. relief valve) 24 may be connected to a port in a control valve, in which the switching valves 1 to 8 are installed, and a separate external drain port (not illustrated).

The construction of the hydraulic circuit according to another embodiment of the present invention, except for the valve 24 installed in a signal pressure sensing line connected to the pilot signal path 11 to detect the signal pressure in the pilot signal path 11 to keep the predetermined signal pressure in the pilot signal path 11, is substantially the same as the hydraulic circuit according to an embodiment of the present invention as illustrated in FIG. 1, and thus the detailed description thereof will be omitted. The same drawing reference numerals are used for the same elements across various figures.

Hereinafter, the operation of the hydraulic circuit for heavy equipment according to another embodiment of the present invention will be described with reference to the accompanying drawings.

As illustrated in FIG. 5, when the high-pressure hydraulic fluid flows from the hydraulic pump into the signal paths a and b through the gap between the valve body 12 and the spool 13, a high-pressure signal pressure that exceeds the predetermined pressure is formed in the pilot signal path 11.

That is, if the signal pressure formed in the pilot signal path 11 exceeds the predetermined pressure, it is drained to the hydraulic tank T2 by the valve 24 installed in the signal sensing line coupled to the pilot signal path 11, and thus the predetermined pressure can be maintained in the pilot signal path 11.

Accordingly, the pressure switch 9 installed in the signal sensing line coupled to the pilot signal path 11 is prevented from being damaged due to the pressure exceeding the predetermined pressure.

As described above, the hydraulic circuit for heavy equipment according to the embodiments of the present invention has the following advantages.

Even if a working device such as a boom and so on is not driven in a hydraulic circuit implementing an auto idle function, the damage of a pressure switch due to an inflow of a high-pressure hydraulic fluid from a hydraulic pump to a pilot signal path formed in a respective switching valve for controlling the hydraulic fluid being fed to the working device, which is caused by the gap between the body and the spool of the respective switching valve or by the damage of the sliding part, can be prevented.

Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A hydraulic circuit for heavy equipment, comprising:

first to fourth hydraulic pumps connected to an engine;

first switching valves composed of valves installed in flow paths of the first hydraulic pump and shifted to control hydraulic fluid fed to working devices including a boom;

second switching valves composed of valves installed in flow paths of the second hydraulic pump and shifted to control hydraulic fluid fed to working devices including an arm;

third switching valves composed of valves installed in flow paths of the third hydraulic pump and shifted to control hydraulic fluid fed to a swing device;

a pilot signal path connected to a hydraulic tank through the first to third switching valves to sense whether the first to third switching valves are shifted, and coupled to a pilot signal pressure supply path of the fourth hydraulic pump;

a throttling part installed in the pilot signal path to form a signal pressure; and a valve installed in a parallel flow path branch-connected to the pilot signal path on upstream and downstream sides of the throttling part, and supplying the signal pressure in the pilot signal path to the pilot signal pressure supply path when a signal pressure that exceeds a predetermined pressure is formed in the pilot signal path.

2. The hydraulic circuit of claim 1, wherein the valve comprises a check valve for permitting a transfer of the signal pressure from the pilot signal path to the pilot signal pressure supply path.

3. A hydraulic circuit for heavy equipment, comprising:

first to fourth hydraulic pumps connected to an engine;

first switching valves composed of valves installed in flow paths of the first hydraulic pump and shifted to control hydraulic fluid fed to working devices including a boom;

second switching valves composed of valves installed in flow paths of the second hydraulic pump and shifted to control hydraulic fluid fed to working devices including an arm;

third switching valves composed of valves installed in flow paths of the third hydraulic pump and shifted to control hydraulic fluid fed to a swing device;

a pilot signal path connected to a hydraulic tank through the first to third switching valves to sense whether the first to third switching valves are shifted, and coupled to a pilot signal pressure supply path of the fourth hydraulic pump;

a throttling part installed in the pilot signal path to form a signal pressure; and a valve installed in a signal pressure sensing line branch-connected to the pilot signal path to detect the signal pressure in the pilot signal path, and discharging the signal pressure in the pilot signal path to the hydraulic tank when a signal pressure that exceeds a predetermined pressure is formed in the pilot signal path.

4. The hydraulic circuit of claim 3, wherein the valve comprises a relief valve that is shifted to drain the signal pressure to the hydraulic tank when the signal pressure exceeding the predetermined pressure is formed in the pilot signal path.

5. The hydraulic circuit of claim 4, wherein a drain path of the valve is connected to a port in a control valve, in which the switching valves are installed, and a separate external drain port.

* * * * *